United States Patent Office 3,497,582
Patented Feb. 24, 1970

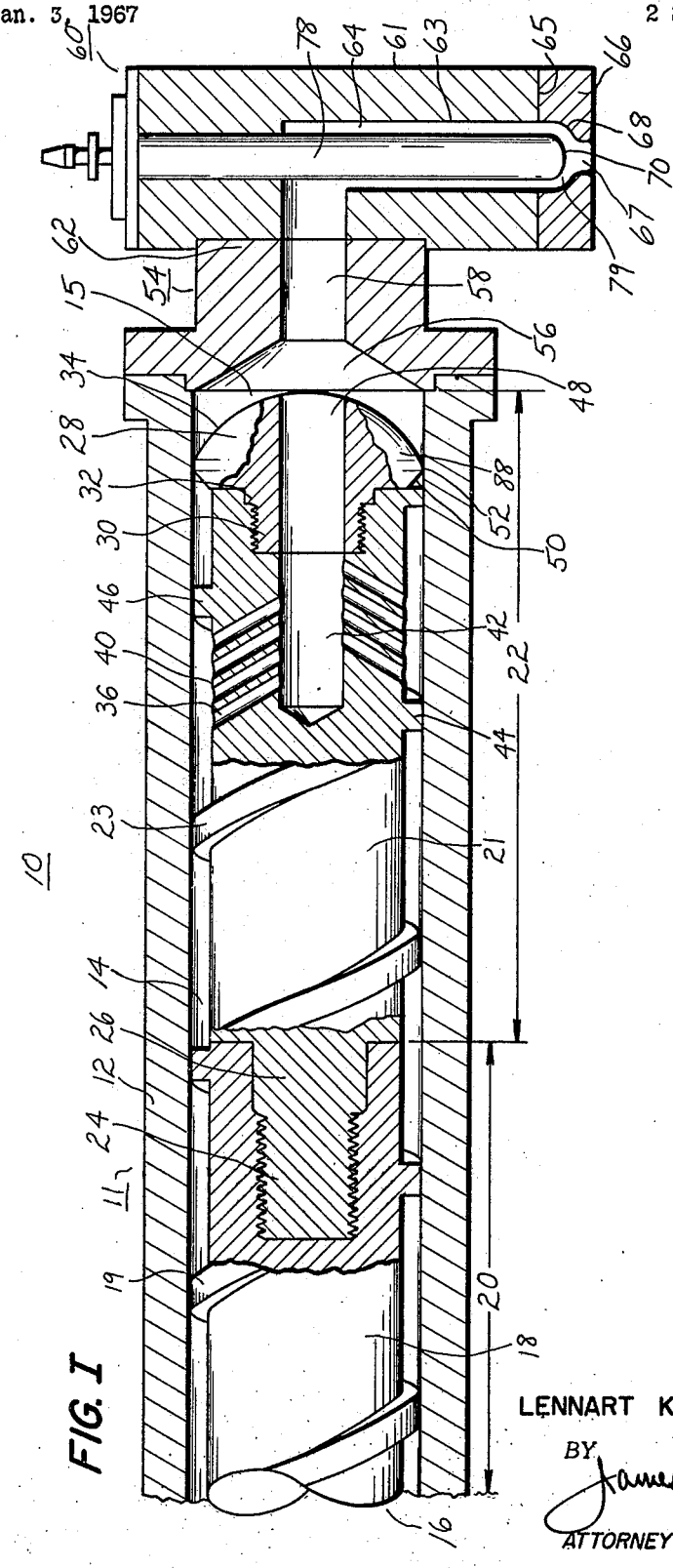
Feb. 24, 1970 — L. K. PETTERSSON — 3,497,582
PLASTIC EXTRUSION
Filed Jan. 3, 1967 — 2 Sheets-Sheet 1
FIG. I
INVENTOR.
LENNART K. PETTERSSON
BY
ATTORNEY Feb. 24, 1970   L. K. PETTERSSON   3,497,582
PLASTIC EXTRUSION
Filed Jan. 3, 1967   2 Sheets-Sheet 2
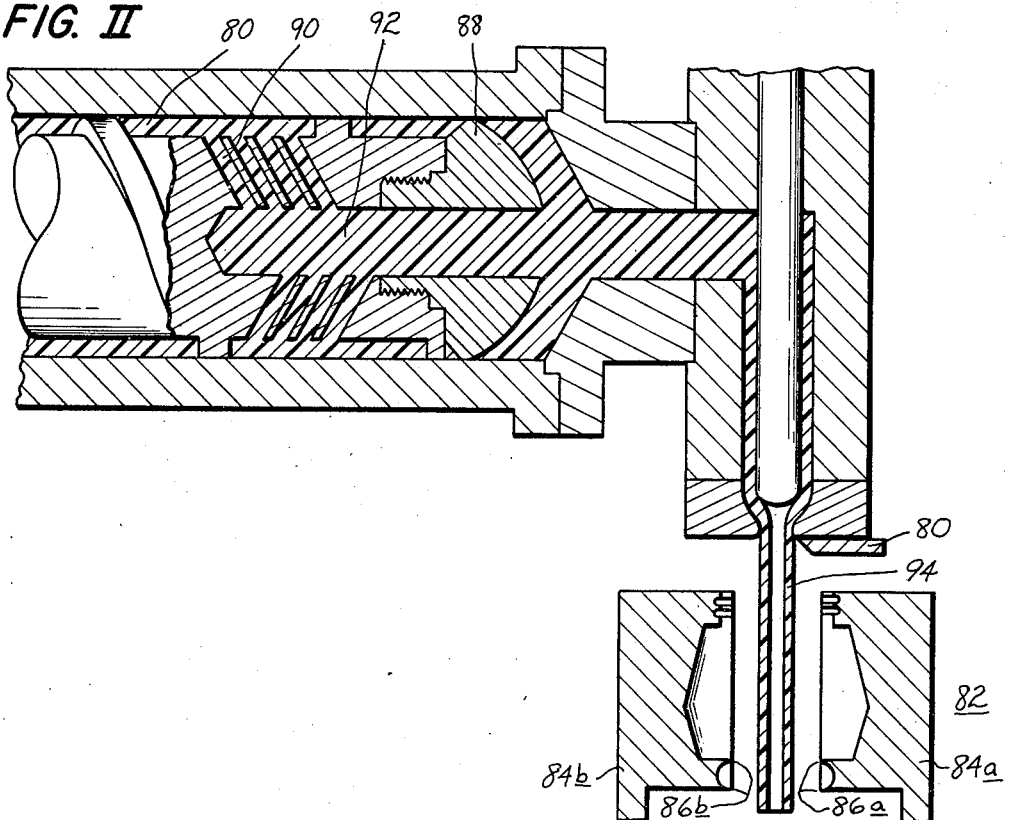
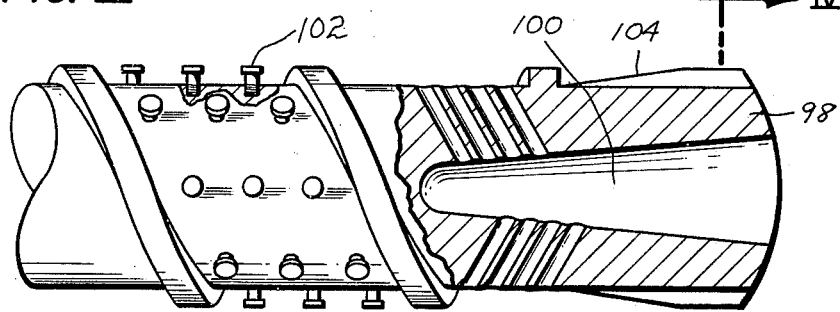
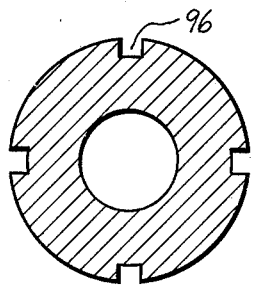
INVENTOR.
LENNART K. PETTERSSON
BY
ATTORNEY:

3,497,582
PLASTIC EXTRUSION
Lennart K. Pettersson, Bloomfield, Conn., assignor to Monsanto Company, St. Louis, Mo., a corporation of Delaware
Filed Jan. 3, 1967, Ser. No. 606,706
Int. Cl. B29d 23/03, 23/04
U.S. Cl. 264—98                               1 Claim

ABSTRACT OF THE DISCLOSURE

A method of using an extruder screw nose structure which causes diversion of the plastic melt through radial channels in the screw into an internal hollow portion of the screw prior to extrusion through the discharge orifice, to improve mixing of the melt for the formation of a blow moldable parison.

---

This invention relates to plastic extrusion, and more specifically to the extrusion of highly mixed plastic melts.

In known processes for forming hollow plastic articles by expansion of a heated thermoplastic tube in a partible mold, the hot tube is extruded in a freely pendant vertical form from a horizontally disposed orifice. It is a matter of some difficulty to extrude such a freely pendant tube of hot workable plastic without lateral movement thereof, and it is quite common for the end of the extruding tube to curl laterally out of alignment with the axis of the extruder orifice. This walking or hooking of the parison on leaving the extrusion orifice, as it is called in the art, is believed caused by variations in the plastic being operated on, and by differences in temperature, pressure and viscosity of the melt in the exit end of the extruder. The volume of plastic material between the bights at the end of the screw often remains incompletely mixed, with partially fused portions thereof carried through the extrusion head and out the discharge orifice. The rotary motion of the screw is carried through the system and appears as rotational movement in the discharging parison, because of the friction developed between the confining walls of the extrusion head and the colder low viscosity portions of the melt. The incompletely mixed, cooler low viscosity portions of the parison do not expand at the same rate as the hotter sections in forming the finished article, thereby resulting in uneven wall thicknesses with the hotter portions of the parison forming a thin section, and the cooler portions thicker sections. Parison curling increases flash and waste in the blown article, since the parison cannot be accurately aligned within the mold. The problem of course is especially acute as through-put increases, and the incompletely mixed portions of the plastic melt correspondingly increase. This is especially annoying and costly when demands on equipment are high.

In attempts to solve the problem, prior art machines have employed mandrels and other tube guiding apparatus to align the parison with the mold cavity. This approach involves the use of additional costly equipment, chills the parison at the point of contact with the positioning apparatus, and does not solve the problem of uneven wall thickness in the blown article.

Accordingly it is the principal object of the present invention to provide a method for improving the homogeneity of a thermoplastic melt.

It is a particular object of the present invention to provide an improved method for shaping thermoplastic, i.e. into sheet, tubular form etc.

It is a further object of the present invention to provide method for efficiently controlling the flow of an extruding parison to improve the quality and distribution of plastic in hollow articles produced therefrom.

It is an additional object of the present invention to correct differences in temperature and viscosity of a thermoplastic melt so that more uniform expansion of the tubular parison formed therefrom is made possible.

It is a still further object of the present invention to provide a method for aligning a vertically extruded tube of thermoplastic with respect to a partible mold so the tube will always be properly positioned with respect to the mold prior to closing thereof.

It is a still further object of the present invention to provide method for aligning a vertically extruded thermoplastic tube with respect to a partible blow mold, without in any way contacting the extruded tube.

Yet another object of the present invention is to increase the output of an extruder by providing an improved screw design.

It is a further object of the present invention to provide method for solving the previously mentioned prior art deficiencies.

It is an additional object of the present invention to provide a method to carry out the above objects.

Other objects of this invention will in part be obvious and will in part appear hereinafter.

These and other objects are accomplished by providing a method for extruding a plastic melt by advancing the plastic melt with an extrusion screw having a hollow portion, longitudinally through extrusion apparatus toward the discharge end thereof, imposing a resistance to the longitudinal flow inwardly of the discharge end to divert at least a portion of the melt into a plurality of individual streams flowing into the hollow portion of the extrusion screw, and merging the individual streams into a homogeneous mass upstream of the discharge end of the extrusion apparatus.

In describing the overall invention, reference will be made to preferred embodiments illustrated in the accompanying drawings, in which:

FIG. I is a schematic, transverse, partially sectioned, elevational view of the apparatus of the present invention.

FIG. II is a schematic view of the apparatus of FIG. I, illustrating an extruded parison between sections of a blow mold without lateral movement of the parison.

FIG. III is a partially sectioned, schematic, transverse, elevational view of an alternate embodiment of the extrusion screw of the present invention.

FIG. IV is an elevational view taken along the line IV—IV of FIG. III.

With reference to the drawings wherein identical numerals refer to identical parts, there is shown in FIG. I an extrusion unit 10 comprising an extruder 11, a die 54, and an extruder head 60. Extruder 11 has an elongated casing 12 defining an internal lengthwise bore 14 having an outlet 15. Rotatable extrusion screw 16 is mounted within bore 14. In such apparatus solid plastic is introduced in granular or other form from a conventional hopper through an inlet port, opening into bore 14 at the opposite end from exit 15, and is not shown. The walls of casing 12 are heated or cooled by suitable means ( not shown) also in a conventional manner. Screw 16 is driven by conventional drive means, also not shown. The solid plastic introduced into the entrance end of extruder 11 is masticated and mechanically worked into a plastic melt by frictional shearing contact between the rotatable extruder screw 16 and the internal wall of the elongated casing as it advances toward exit end 15 of extruder 11, in a manner well known in the art.

Rotatable screw 16 comprises a main portion 20 having a barrel 18 and helical threads or flights 19, and a nose section 22, likewise having a barrel 21 with helical flights 23 integrally mounted thereon. The end of main portion 20, as shown in FIG. I, has a threaded female cavity, and an enlarged unthreaded cylindrical centering section for connection of one end of nose section 22 thereinto, by means of male threaded projection 24 and centering pin 26 of nose section 22. At the opposite end of nose section 22 there is provided cap 28 threadably connected into the end of the barrel of nose section 22 by male projection 30. Provisions for centering the cap prior to threadable connection into the nose are provided by annular shoulder 32 and a cooperating annular recess in the rear face of the barrel of nose section 22. Cap 20 of nose section 22 has outwardly curving convex surface 34, having a diameter equivalent to that across the screw flights as shown in FIG. I which is incrementally less than the inside diameter of the bore 14, to allow for clearance therebetween on rotation of the screw. Nose section 22 has a plurality of groups of plastic distributing passages 36 extending between the outer surface 40 of barrel 21 at an angle of approximately 30° with the vertical, to internal chamber or cylindrical bored section 42. Passages 36 extend around the circumference of barrel 21 between the two final flights 23 and 46 of nose section 22, increasing in number along the axis of the nose section toward the rear discharge end. Cap 28 also has a cylindrically bored hollow channel 48 in axial alignment, and forming an extension with cylindrical bored section 42 of nose section 22. Channel 48 connects bored section 42 with discharge opening 15 of extruder 11. Cap 28 has a chamfered surface 50 extending outward from its rear end, and around its circumference, terminating at the rear edge of axially extending flat surface 52, which connects the edges of convex surface 34 with chamfered surface 50.

Die 54 is mounted on discharge end 15 of extruder 11, having tapering transitional passageway 56 and adjacent annular cavity 58.

Extrusion head 60 is mounted on the discharge end 62 of die 54, and has an outer wall 61, an inner wall 63 and a lower face 65. Chamber 64 is provided within head 60, on the lower portion of which is mounted extrusion ring 66 attached to lower face 65. Ring 66 has orifice 67 therein, and is made concave at 68 on its internal side to divert plastic beneath convex tip 70 of parison forming member or mandrel 78, vertically disposed within chamber 64. Convex tip 70 cooperates with, and is in axial alignment with orifice 67 to form horizontally disposed annular outer orifice 79 in extrusion head 60 for the extrusion of hollow tubing. A knife 80, as shown in FIG. II operated by conventional activating means such as a pneumatic cylinder (not shown) is provided beneath extrusion head 60 to cut the extruded tubing into the desired lengths. Other methods of severing the parison may be used. For example, an axially reciprocable mandrel having a cutting edge at its lower end will give equally satisfactory results.

Each parison may be blown in partible mold 82 comprising cooperating mold halves 84a and 84b in a conventional manner well known to those in the art. Mold 82 has cooperating pinch edges 86a and 86b in its lower end for sealing the leading end of the parison as the mold halves are closed about it. Mold 82 is supported and operated in any desired manner.

Referring now to the operation of the system, the main portion 20 of rotatable screw 16 masticates and fuses solid plastic fed to extruder 11 through an inlet (not shown) into plastic melt 80 as shown in FIG. II. The plastic is extruded under pressure through lengthwise bore 14 of casing 12 in a conventional manner toward discharge end 15, and is further worked by nose section 22 as it advances toward this discharge end. However, instead of the plastic melt passing around the discharge end of the extrusion screw and through discharge die 54, as is the conventional method, the outer portion 88 of cap 28 is imposed transversely across the end of axially extending annular passage 14 of extruder 11. Outer portion 88, therefore, acts as a resistance to the flow of the plastic melt therethrough, and causes it to be broken up into a plurality of individual streams 90 as shown in FIG. II, and to be diverted through distributing passages 36 of nose section 22. The individual streams then merge together into a solid stream 92 of homogeneous melt in internal chamber 42 of nose section 22, which flows under the influence of the pressure developed by the rotating screw, through channel 48 of cap 28 in axial alignment with chamber 42. Thus by imposing a resistance normal to the longitudinal flow of plastic melt, the incompletely mixed portions of the melt lying between the screw flights, and generally more adjacent the interior wall of the casing, rather than the outer surface of the screw barrel, are dispersed into individual streams flowing essentially radially to the direction of flow prior to dispersion. Thereafter the streams are intimately merged together into a solid mass prior to passage through the extruder discharge 15.

After leaving the extruder the solid homogeneous melt passes through die 54 and into extrusion head 60 where it is welded into tubular form around parison forming member 78. It is then extruded through annular outlet orifice 67 of extruxion head 60 to form a downwardly extending vertically pendant, radially stationary parison 94. After extrusion of sufficient length necessary to form an article, knife 80 is activated and passes across the lower face of extrusion ring 66 to sever the extruder parison from the plastic melt within the extrusion head. Simultaneously therewith, or immediately before, mold halves 84a and 84b are conventionally closed around parison 94 sealing the leading end between pinch edges 86a and 86b. Pressurized gas is thereupon introduced into the parison through its opposite open end adjacent the extrusion head to expand the parison against the inner walls of mold 82, which conform to the shape of the finished article. Blowing of a parison in a partible mold is a process well known to those skilled in the art and has not been illustrated in detail.

In FIGS. III and IV is shown an alternate embodiment of the extruder screw nose structure of the present invention. The screw of this embodiment is a one piece unit with the nose structure included as an integral part of the screw, machined for example from a common length of stock. For certain types of plastic melts, for example, polyvinyl chloride, which may not be able to completely endure the intense working and possible temperature increase caused by passage through the narrow distributing passages, a portion of the melt may be allowed to by-pass the radial flow route and proceed through slots 96 cut in the outer circumference of cap 98. The portion of the flow passing through these slots merges with the highly mixed portion passing through the hollow interior of the screw nose downstream of the cap. The surface of the barrel may taper outwardly into the maximum diameter of the cap as at 104 around the circumference thereof, except in the areas where slots 96 are cut therein. This taper aids in eliminating dead spots and tends to force the material back towards the distributing passages.

For certain types of plastic materials it may also be desired to have the hollow portion of the extruder nose increase in diameter along the axial length of the nose as shown at 100 in FIG. III. This chamber configuration is particularly adapted for use with heat sensitive plastic melts.

Also, if desired, increased mixing of the melt may be achieved in the metering section of the screw by use of a multitude of cap screws or studs typically shown as 102 in FIG. III, mounted in groups between the screw flights in the surface of the screw barrel. Use of cap screws in conjunction with the aforementioned screw center extrusion is preferred when extruding colored melts where maximum to insure good dispersion of the differing colors is required.

The above description and particularly the drawings are set forth for purposes of illustration only and are in no way to be taken in a limited sense.

As mentioned previously, this invention is directed toward a method and apparatus for improving the homogeneity of a plastic melt being extruded through an extrusion apparatus, comprising the steps of advancing the plastic melt with an extrusion screw having a hollow portion, longitudinally through the extrusion apparatus toward the discharge end thereof, imposing a resistance to the longitudinal flow inwardly of the discharge end to direct at least a portion of the melt into a plurality of individual streams flowing into the hollow portion of the extrusion screw, and merging the individual streams into a homogeneous mass upstream of the discharge end of the extrusion apparatus.

The masticating means within the extruder for advancing and fusing the plastic material need not be limited to an extruder screw, but may as well, for example, be a reciprocal cylindrical ram having the nose structure previously set forth for the extrusion screw, and operated intermittently by means of, for example, cylinder operated piston activating means.

The nose design embodiments previously mentioned are applicable for enhancing mixing during extrusion of any shape, and are not necessarily confined to parison forming applications. For example, the present invention is applicable to extrusion of sheet and solid tubing as well as to extrusion of tubular parisons. The solid tubing might be extruded, for example, through a vertically disposed extruder discharge orifice mounted on the outlet of the extruder in place of a vertically positioned, parison forming extrusion head, onto a set of mill rolls or the like for further shaping or processing. It is a particularly preferred embodiment of the present invention, however, to utilize the described method and apparatus in conjunction with blow molding operations where hollow articles are formed by expanding tubular parisons. In utilizing the present invention in these processes, the rotary motion otherwise imparted to the vertically pendant parison by the rotating extruder screw, because of differences in temperature and viscosity of the extruding melt, is eliminated. The parison may be enclosed within the blow mold in the desired location, and flash caused by curling movement of the parison while the mold is enclosing it, is eliminated.

The plastic distributing passages extending between the outer surface of the barrel of the masticating means of the present invention and the internal chamber thereof are preferably very small in cross sectional area, and numerous. It is necessary that they be sufficiently small to build up sufficient back pressure in conjunction with the cap on the end of the nose to permit essentially complete fusing of the plastic upstream of the tip section. Their preferred location is in the metering section of the masticating means, as it is commonly referred to in the art, and adjacent the end thereof. They may be arranged in any pattern around the circumference of the barrel, and when a screw is used, between the flights thereof. For example, they could be arranged in a number of circular rows with the holes in each row being equidistantly spaced, but staggered in an axial direction. Alternately, they may be patterned in a series of lengthwise groups with the holes within each group being in axial alignment, but the groups being axially staggered with respect to each other. In general it has been found for most materials and screw diameters that the diameter of the holes should be between about $\frac{1}{36}''$ to about $1''$ and preferably about $\frac{1}{4}''$.

The flow of plastic melt may either circulate entirely through the center of the masticating means prior to discharge, or as previously mentioned, only a portion thereof may be circulated internally, with the remainder flowing through slots or openings in the circumference of the end cap. The amount to be bypassed as previously mentioned will vary depending on the characteristics of the material being processed, and obviously may be changed by varying the number of slots or chambers in the periphery of the cap, or by utilizing removably mounted caps without channels, but with differing outside diameters.

The length of the plastic distributing passages may be varied within wide limits, and likewise is dependent to a large extent of the amount of pressure drop which can be taken, and the extent of working which the material being processed may withstand without decomposition occurring. In cases where a screw or worm is utilized, the total cross-sectional area of a set of plastic distributing passages, defined as those located between two flights of an extruder screw should be maintained between 0.25 to 4 times the cross-sectional area between those two flights, defined by the space between the outer surface of the screw barrel or root diameter of the screw, and the inner surface of the extruder casing bore. It is preferred, however, that these two cross-sectional areas be maintained approximately equal to prevent build-up of appreciable back pressure within the extruder.

It is preferred to maintain equal the cross sectional area of the internal chamber of the nose section and of the extension thereof in the cap, although it may be increased as shown in the alternate embodiment. For example, when the holes are arranged so as to progressively increase in a direction toward the discharge end of the extruder, the cross-sectional area of the internal chamber may also be progressively increased via a taper to equal the increase in the total cross sectional area of the holes. The cross sectional shape of the internal chamber may, for example, take the shape of a venturi, flaring out into a maximum diameter at the outer end of the cap, with the throat or minimum cross-section located in the area of communication with the passageways and being less than the total cross-sectional area of the holes. This design might be utilized when enhanced mixing is desired and the material being processed can withstand the incremental additional pressure caused by the venturi effect.

The cross-sectional shape of the passages and of the internal sections of both the tip and cap may likewise take any form, as governed by the amount of drag the melt can withstand. For example, rectangular, diamond, square, etc. may be used. For pressure drop reasons circular is preferred Similar considerations govern in specifying the angle of entry of the passages. This angle as defined by that between the axis of the passageways and the axis of the masticating means on the upstream side of the point of intersection may vary between about 10° to about 150°, and preferably between about 30° to about 80°. Obviously the more streamlined the flow the lower the pressure drop.

It is preferred that the structure providing for internal circulation in the present invention be located immediately adjacent the end of the masticating means in the metering section as previously shown. However the internal chamber and plastic distributing passages may extend back as far as 40% of the total length toward the feed end of the screw, depending on the extent of mixing desired. For most materials, a maximum of 10% produces satisfactory results.

When utilizing the unique structure of the present invention, the quality of plastic melt which may be circulated internally may vary within wide limits. For most materials it has been found that at least 20% of the flow of thermoplastic melt must be circulated internally in order to realize the benefits of the improved mixing of the present invention. As much as 100% of the flow has been circulated internally with successful results. When it is desired to split the flow, and a portion thereof bypasses the internal circulation route, the modified slotted cap structure of the alternate embodiment may be utilized, or a nose section having a diameter less than the maximum diameter of the masticating means may be used.

Any plastic material capable of being extruded may be utilized in the present invention. Typical materials are thermoplastics, such as low or high density polyethylene, polypropylene, polymers of vinyl chloride or polystyrene. Especially good results have been obtained with high density polyethylene.

In the case of extrusion applicable to the formation of tubular parisons to be blow-molded into hollow articles, satisfactory results have been obtained with high density polyethylene wherein 80–100% of the melt is circulated internally through circular passageways of ⅛–½ inch diameter, entering the internal chamber of the nose section at an angle of entry of between about 30–80 degrees, and wherein the cross-sectional area of the internal chamber is between about 80–110% of that of the total cross-sectional area of the holes. Furthermore the total cross-sectional area of the passages between screw flights was maintained approximately equal to that between the internal diameter of the bore and the root diameter of the flights between the flights where the passages were located.

When utilizing a vertically mounted, tubular, parison forming extrusion head, numerous additional operations may be employed with the present invention. For example, the wall thickness distribution, surface characteristics, temperature and shape of the extruding parison may be varied. Reference may be made to copending applications, Ser. No. 391,920, filed Aug. 25, 1964, and now abandoned; 583,525, filed Oct. 3, 1966; 587,255, Oct. 17, 1966; and U.S. Patent No. 3,217,360, all of which are assigned to a common assignee. The various parison treating techniques set forth therein are included herein by reference.

Additional means may be employed within the extruder in cooperation with the nose design of the present invention when enhanced mixing is desired. For example, when extruding colored melts, and it is desired to eliminate all traces of concentrated portions of colored material, cooperating intermeshing masticating gears may be employed in place of the screw flights in the metering section, one half of the gears being fixedly mounted at spaced intervals on the barrel of the masticating means, and the cooperating portion correspondingly fixedly mounted on the inside surface of the lengthwise bore. Though extremely good mixing and break-up of cold spots is achieved with the use of such masticating gears, they require frequent replacement because of wear and breakage which occurs when tramp metal contaminants appear in the plastic melt.

Obviously the nose design including the cap portion of the present invention may be integrally built as a single extruder screw or removably mounted at the end thereof as shown in the preferred embodiment. Removable mounting permits easy replacement for different types of materials without requiring dismantling of the complete extruder.

A major advantage of the method and apparatus of the present invention is the elimination of cold spots in extruding plastic melts. By so doing, "walking" of an extruded tubular parison as it extends below the extrusion orifice which interferes with the subsequent forming operation is eliminated, and extrusion unit output increased, while at the same time improving yield and quality of the finished articles.

Various other modifications and alterations will be readily suggested to persons skilled in the art.

What is claimed is:
1. A method of forming a hollow article of thermoplastic material comprising the steps of:
  (a) heating thermoplastic material to a flowable condition in an extrusion apparatus;
  (b) longitudinally advancing the heated material under pressure toward a discharge outlet of the apparatus with a rotating extrusion screw having a hollow portion on the axis thereof, thereby forming a partially mixed melt;
  (c) imposing a resistance to the longitudinal flow in a direction normal thereto to prevent further longitudinal movement of a portion of the partially mixed melt;
  (d) dividing said portion of the partially mixed melt into groups of streams flowing toward the hollow portion of the extrusion screw, the remaining portion of the partially mixed melt taking a less tortuous path than said divided portion to reduce temperature and pressure buildup within the extrusion apparatus;
  (e) merging the groups of streams within the hollow portion and said remaining portion downstream of said hollow portion to form a solid homogeneous stream;
  (f) forcing the solid stream around an internal forming member and subsequently through the discharge outlet to form a pendant parison of homogeneous thermoplastic attached at one end to the thermoplastic on the upstream side of said outlet, said pendant parison being substantially free of lateral movement;
  (g) enclosing the parison within a partible mold having an internal configuration conforming to the shape of the article; and
  (h) expanding the parison against the interior of the mold to form the article.

References Cited

UNITED STATES PATENTS

| 3,275,728 | 9/1966 | Martino | 264—98 X |
| 3,281,897 | 11/1966 | Mercer | 264—209 X |
| 3,317,956 | 5/1967 | Lippens. | |
| 3,358,327 | 12/1967 | Maillefer. | |

FOREIGN PATENTS 561,753  4/1957  Italy.

ROBERT F. WHITE, Primary Examiner

T. J. CARVIS, Assistant Examiner

U.S. Cl. X.R.

18—5, 12, 14; 264—209